(12) United States Patent
Liu et al.

(10) Patent No.: US 8,128,335 B2
(45) Date of Patent: Mar. 6, 2012

(54) DISC TURNING DEVICE

(75) Inventors: Ming-Hsun Liu, Taipei (TW); Chung-Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 368 days.

(21) Appl. No.: 12/463,397

(22) Filed: May 9, 2009

(65) Prior Publication Data

US 2009/0211873 A1    Aug. 27, 2009

Related U.S. Application Data (62) Division of application No. 11/687,804, filed on Mar. 19, 2007, now Pat. No. 7,874,786.

(51) Int. Cl.
*B65G 7/08* (2006.01)
*B65G 47/22* (2006.01)

(52) U.S. Cl. ............ 414/758; 414/770; 193/46

(58) Field of Classification Search .......... 193/44–48; 198/374, 402–403; 221/156, 171–173; 414/754, 414/758–759, 768, 773, 780–781, 936; 720/614
See application file for complete search history.

(56) References Cited

U.S. PATENT DOCUMENTS

| | | | |
|---|---|---|---|
| 6,968,763 B2 * | 11/2005 | Chapin et al. .......... | 83/164 |
| 7,874,786 B2 * | 1/2011 | Liu et al. .......... | 414/816 |
| 2008/0232229 A1 * | 9/2008 | Liu et al. .......... | 369/200 |

FOREIGN PATENT DOCUMENTS

| | | | |
|---|---|---|---|
| GB | 2312410 A | * | 10/1997 |
| JP | 60019639 A | * | 1/1985 |
| JP | 11011674 A | * | 1/1999 |
| WO | WO 9615967 A1 | * | 5/1996 |

* cited by examiner

*Primary Examiner* — Gregory Adams (57) ABSTRACT

A disc turning device is formed with at least one support portion at one side of a center of gravity of the disc to make a disc turn over automatically by gravity by turning about the support portion, thus achieving the objectives of automatically turning over a disc by gravity, and saving energy.

2 Claims, 14 Drawing Sheets

DISC TURNING DEVICE

This application is a divisional application of U.S. patent application Ser. No. 11/687,804, which claims the benefit of the earlier filing date of Mar. 19, 2007 now U.S. Pat. No. 7,874,786. Claim 1, 2, 3, 4 of this application correspond to the previous claim 1 of the U.S. patent application Ser. No. 11/687,804, claims 5-8 of this application correspond to the previous claims 2-5 of the U.S. patent application Ser. No. 11/687,804, claim 9 of this application is new, claims 1, 2 and 10 correspond to the previous claim 6 of the U.S. patent application Ser. No. 11/687,804, and claim 11 of this application corresponds to the previous claim 8 of the U.S. patent application Ser. No. 11/687,804, and claim 12 of this application corresponds to the previous claim 7 of the U.S. patent application Ser. No. 11/687,804.

BACKGROUND OF THE INVENTION

1. Field of the Invention

The present invention relates to a disc turning device, and more particularly to a disc turning device for automatically turning over a disc by gravity.

2. Description of the Prior Art

Conventionally, when one side of a data storage disc is burned or printed, the disc must be turned manually to process the other side. It is an obvious problem that needs to be solved urgently in an automatic operation flow. On the present market, all the machine tools, of whatever type, are driven by electricity, hydraulic pressure and air pressure, their structures must consume energy. If a disc turning unit without energy consumption can be developed, it will be helpful to energy saving.

The present invention has arisen to mitigate and/or obviate the afore-described disadvantages.

SUMMARY OF THE INVENTION

The primary objective of the present invention is to provide a disc turning device comprising at least one support portion about which a disc can turn 180 degrees automatically by gravity.

To achieve the above objective, a disc turning device in accordance with the present invention for automatically turning over a disc comprises a turning space defined for the disc to perform turning operation therein, and at least one support unit provided with a support surface on a top end thereof and a support portion protruding from an edge of the support surface thereof. The support unit is formed within turning space. The disc to be turned over by the disc turning operation is divided into a first section and a second section by a radial center line thereof. The first section of the disc is placed on the support surface of the support unit in such a manner that the second section of the disc is suspended, and the support portion supports against a portion of the first section of the disc, which is not located on the center line of the disc. Hence, after the disc is placed on the support surface, the disc will automatically turn about the support portion under by gravity.

DETAILED DESCRIPTION OF THE PREFERRED EMBODIMENTS

The present invention will be clearer from the following description when viewed together with the accompanying drawings, which show, for purpose of illustrations only, the preferred embodiment of the present invention.

Figure 1:
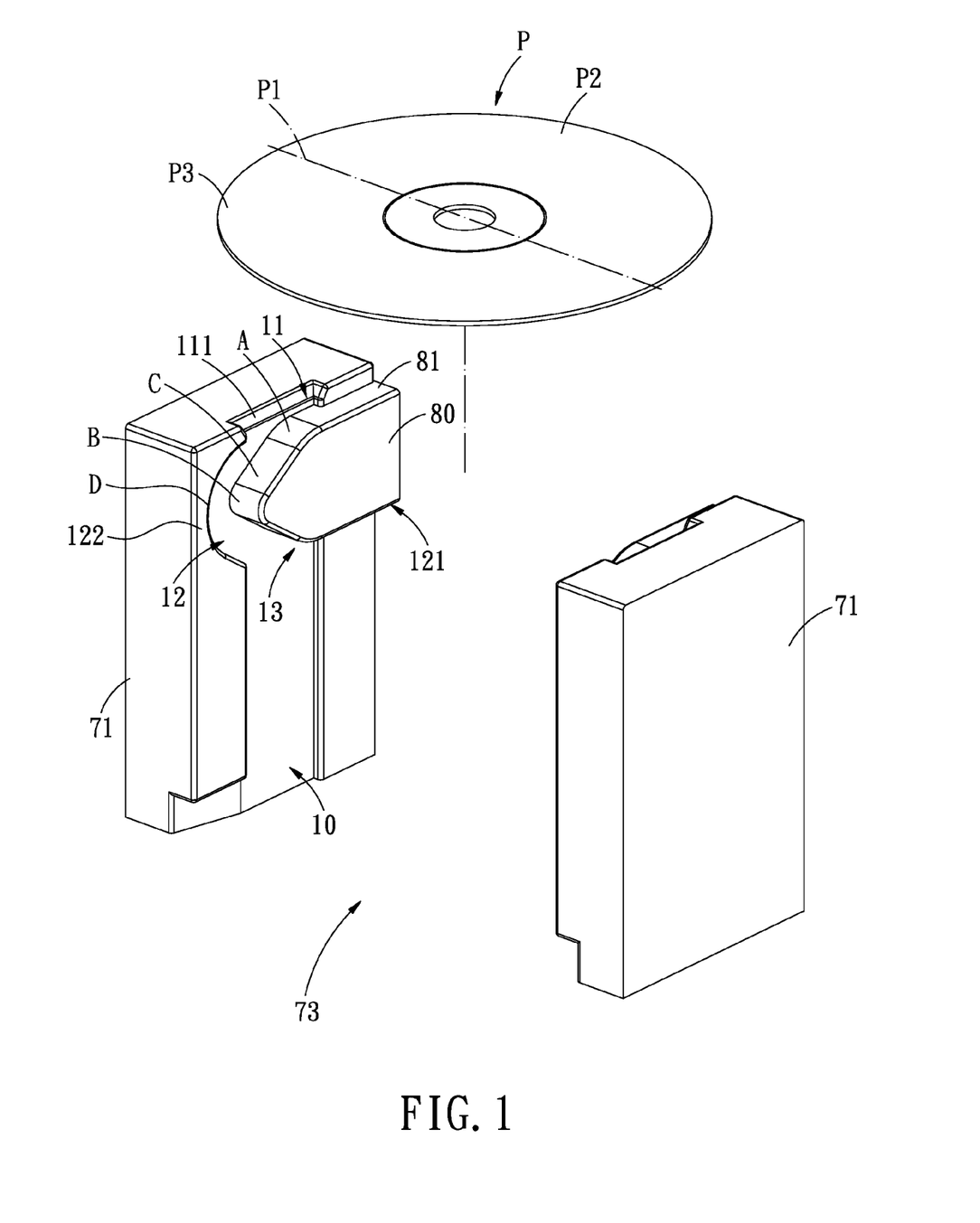
FIG. 1 is a perspective view of a disc turning device in accordance with a first embodiment of the present invention.

Referring to FIG. 1, a disc turning device for automatically turning over a disc P in accordance with a first embodiment of the present invention essentially comprises two longitudinal members 71 that are spaced apart from each other by a distance corresponding to a diameter of the disc P to define a turning space 73. Further, a support unit 80 is formed on an inner surface of the respective longitudinal members 71, and the respective support units 80 are located adjacent to the top ends of the respective longitudinal members 71. The disc P is divided into a first section P2 and a second section P3 by a radial center line P1.

The turning space 73 is provided for the disc P to perform turning operation therein.

Each of the support units 80 is provided with a support surface 81 on a top end thereof, and a support portion A protruding from one edge of the support surface 81. The support units 80 are formed within the turning space 73. The first section P2 of the disc P is placed on the support surfaces 81 in such a manner that the second section P3 of the disc P is suspended, and the support portions A support against a portion of the first section P2 of the disc P, which is not located on the center line P1.

The respective longitudinal members 71 are defined with a rail groove 10 in the inner surface thereof, and the two rail grooves 10 of the two longitudinal members 71 are opposite each other. Each of the rail grooves 10 successively includes, in the direction of gravity, an entry section 11, a turning section 12 and an exit section 13. Each of the entry sections 11 includes a gap 111, and each of the turning sections 12 includes a protruding element 121 and a corresponding concave element 122. Each of the protruding elements 121 protrudes towards one side of the respective rail grooves 10 and cooperates with the respective concave elements 122. Each of the protruding elements 121 is provided with one support unit 80 opposite each of the entry sections 11, and the support portion A of each of the support units 80 is located at one side of a center of the gap 111 of the respective entry sections 11. Each of the protruding elements 121 further includes a protrusion B on a protruding end thereof. Between the support portion A and the protrusion B of each of the protruding elements 121 is formed a sliding surface C. Each of the concave elements 122 includes an arc stopping edge D opposite the protrusion B of each of the protruding elements 121.

It is to be noted that, the gaps 111 of the entry sections 11 of the respective rail grooves 10 are provided for passage of the disc P, and the support portions A of the support units 80 are located in an opposite direction of the protrusions B of the respective protruding elements 121.

Figure 2A:
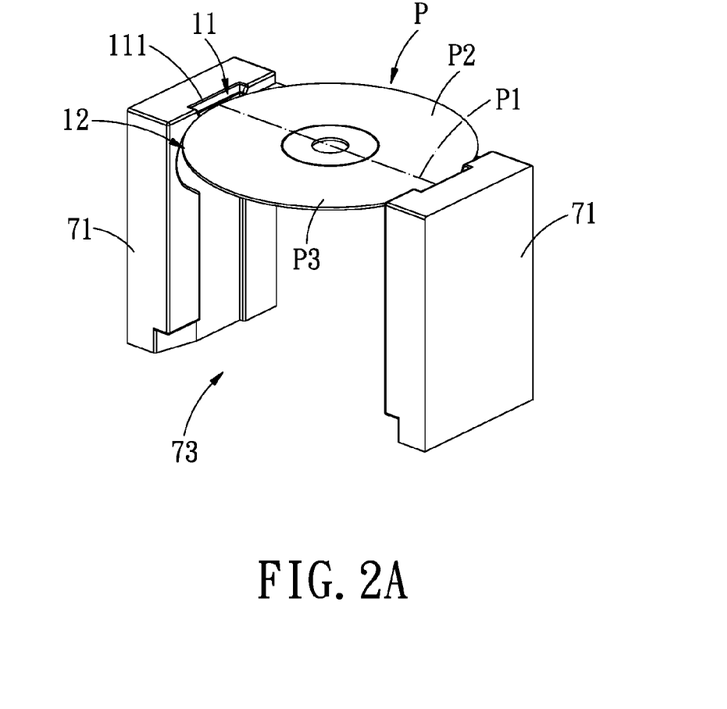
FIG. 2A is a perspective view showing that a disc is placed in the disc turning device of FIG. 1.
Figure 2B:
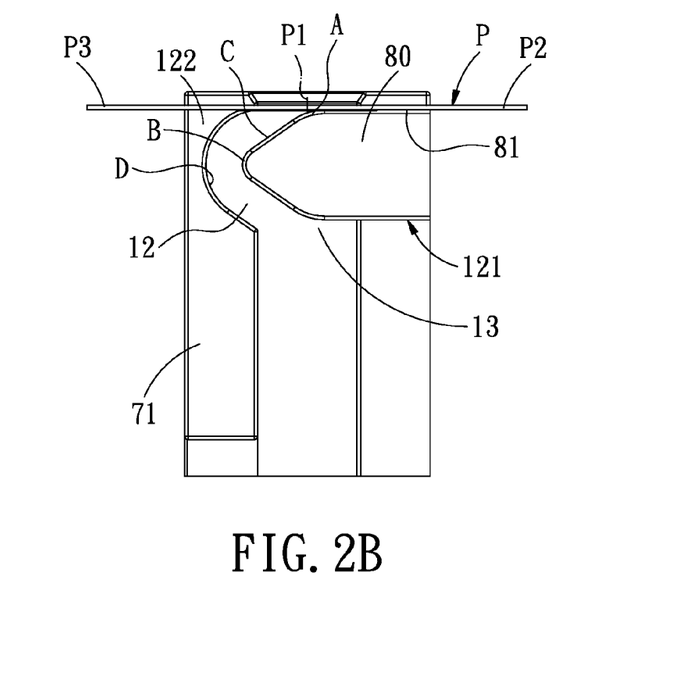
FIG. 2B is a side view of FIG. 2.
Figure 3A:
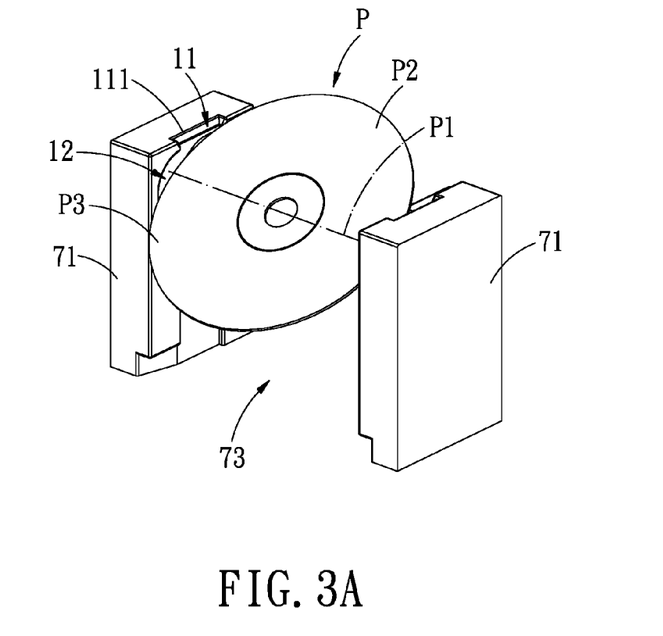
FIG. 3A shows that the disc of FIG. 2 turns about the support portions of the disc turning device in accordance the first embodiment of the present invention.
Figure 3B:
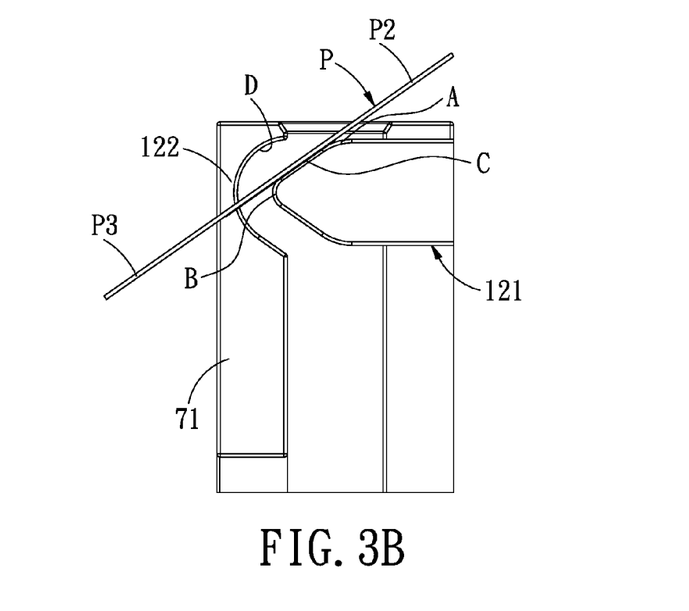
FIG. 3B is a side view of FIG. 3A.
Figure 4A:
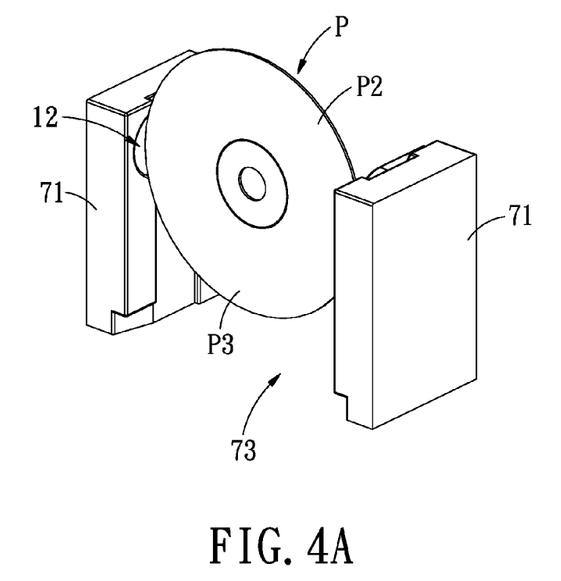
FIG. 4A shows that the disc of FIG. 3A turns about the protrusions of the protruding elements after disengaging from the support portions.
Figure 4B:
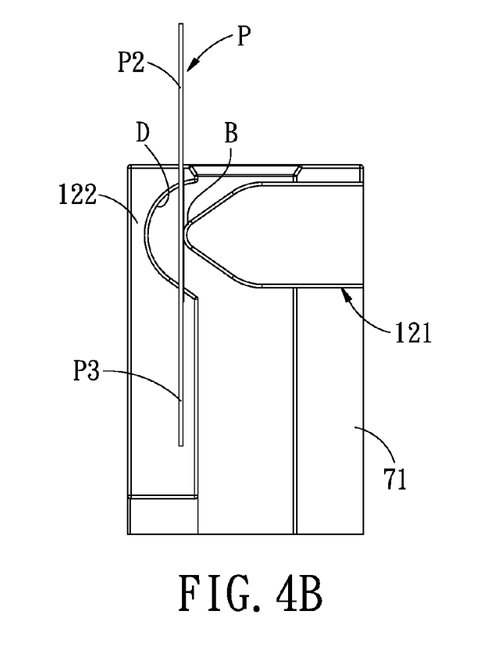
FIG. 4B is a side view of FIG. 4A.
Figure 5A:
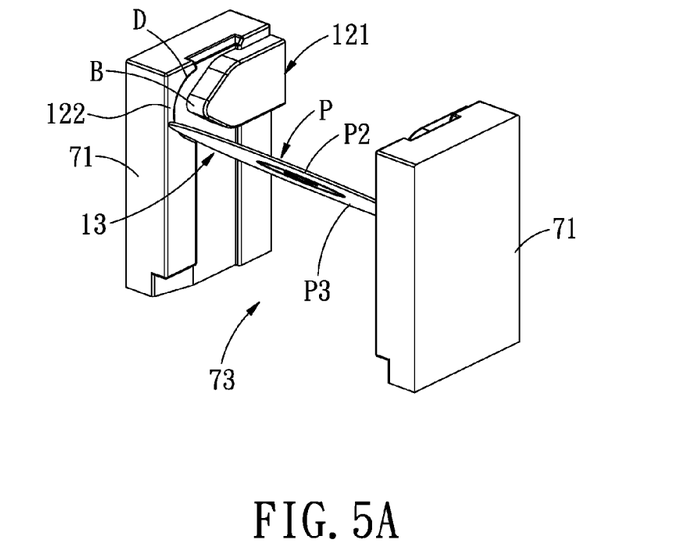
FIG. 5A shows that the disc of FIG. 4A slides along arc stopping edges of concave elements after disengaging from the protrusions of the protruding elements.
Figure 5B:
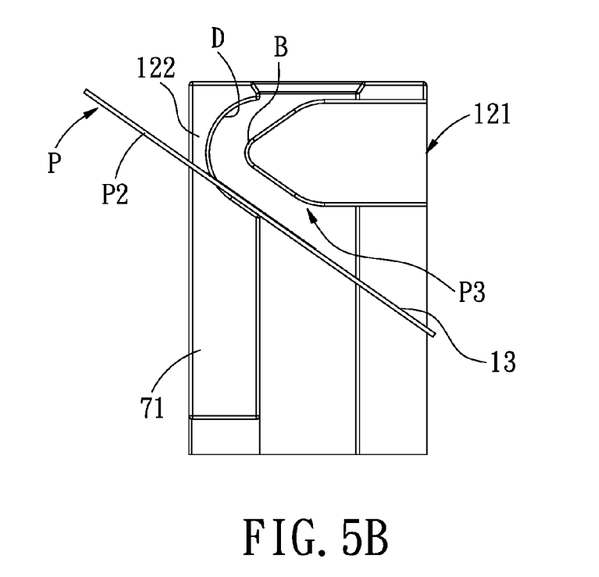
FIG. 5B is a side view of FIG. 5A.
Figure 6A:
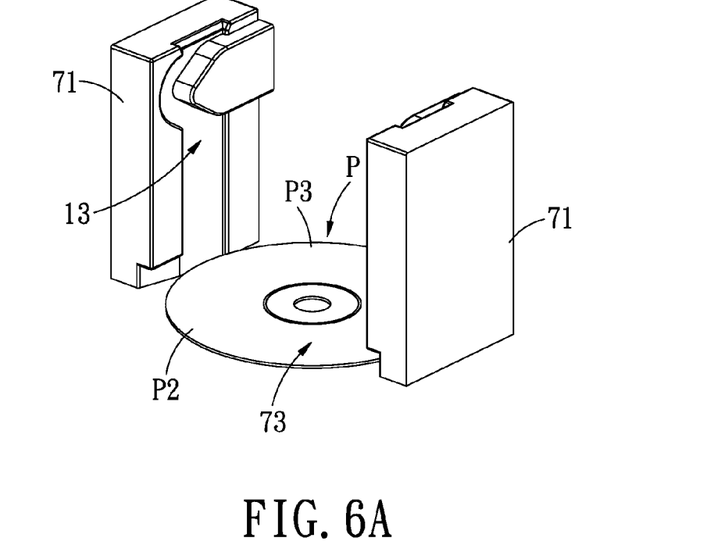
FIG. 6A shows that the disc of FIG. 5A has slid down from the arc stopping edges and finished the turning operation.
Figure 6B:
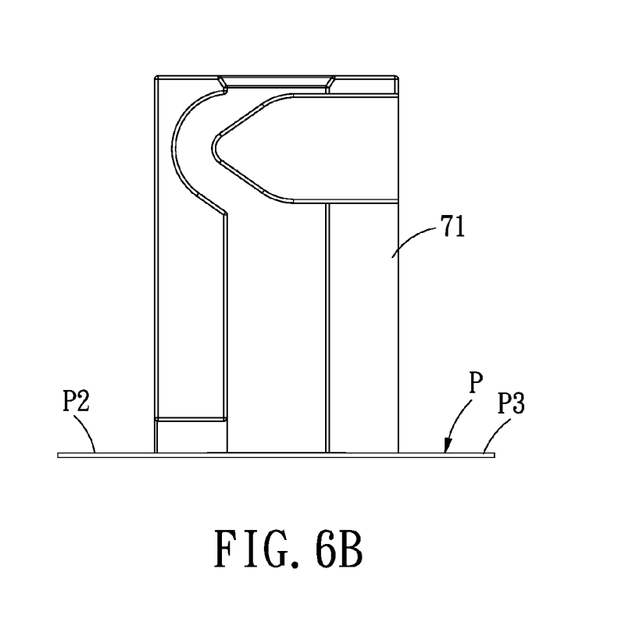
FIG. 6B is a side view of FIG. 6A.

FIGS. 2A-6B illustrate how the disc turning device in accordance with the first embodiment of the present invention performs the disc turning operation. Referring to FIGS. 2A and 2B first, the disc P is inserted between the two rail grooves 10 from the gaps 111 of the entry sections 11 and placed on the support portions A of the support units 80 of the turning section 12. The respective support portions A are located at the one side of the center of the gap 111 of the respective entry sections 11 and located in the opposite direction of the protrusions B of the respective protruding elements 121, and the gravity center of a general optical disc is located at its centre, so that the disc P is supported beside the gravity centre thereof by the support portions A. Thereby, the disc P, as shown in FIG. 3A and FIG. 3B, will turn about the support portions A toward the protruding direction of the protruding elements 121 under the action of gravity, namely toward the protrusions B. After abutting against the sliding surfaces C of the protruding elements 121, the disc P will turn about the protrusions B of the protruding elements 121 along the arc stopping edges D of the concave elements 122, as shown in FIGS. 4A and 4B. Then, as shown in FIGS. 5A and 5B, under the action of gravity and the rotation-caused centrifugal force, the disc P will disengage from the protrusions B and then slide along the arc stopping edges D in the direction of gravity. Finally, as shown in FIGS. 6A and 6B, the disc P will slide out from the exit sections 13. Through the above steps, the disc P has turned 180 degrees and finished the disc turning operation.

It is to be noted that, after the disc P is placed on the support units 80 of the two longitudinal members 71, since the first section P2 of the disc is placed on the support surfaces 81 of the support units 80, and the support portions A of the support units 80 support against the portion of the first section P2 of the disc P, which is not located on the center line P1 of the disc P, thus, under the action of gravity, the disc P will lose its balance and turn over automatically within the turning space 73 by rotating about the support portions A of the support units 80, namely the second section P3 of the disc P will turn downwards.

Furthermore, as shown in FIGS. 7-9B, a disc turning device in accordance with a second embodiment of the present invention comprises two longitudinal members 30, 40 that are spaced apart from each other by a distance corresponding to a diameter of the disc P to define a turning space 60. The longitudinal member 30 is formed with a support unit 90, and the support unit 90 is formed on a top end of the longitudinal member 30. The support unit 90 also includes a support surface 91 on a top end thereof, and a support portion 92 protrudes from one edge of the support surface 91. The support unit 90 is formed within the turning space 60. The first section P2 of the disc P is placed on the support surface 91 in such a manner that the second section P3 is suspended, and the support portion 92 supports against a portion of the first section P2 of the disc P, which is not located on the center line P1.

Figure 7:
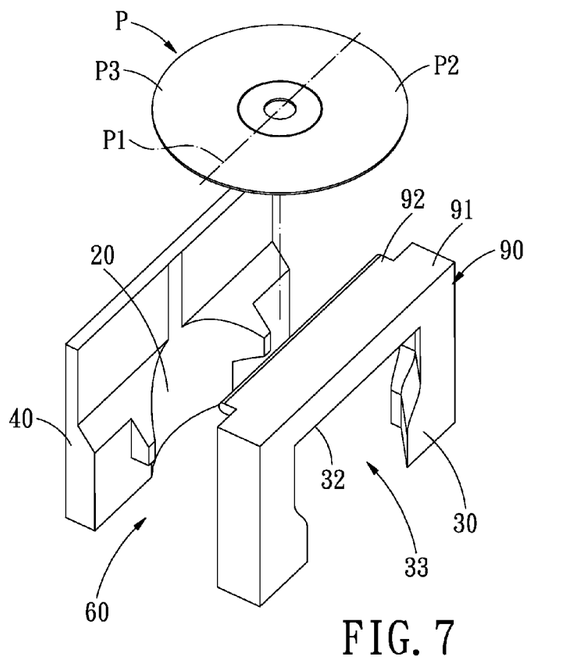
FIG. 7 is a perspective view of a disc turning device in accordance with a second embodiment of the present invention, showing that one of the two longitudinal members is formed with a support unit.
Figure 8:
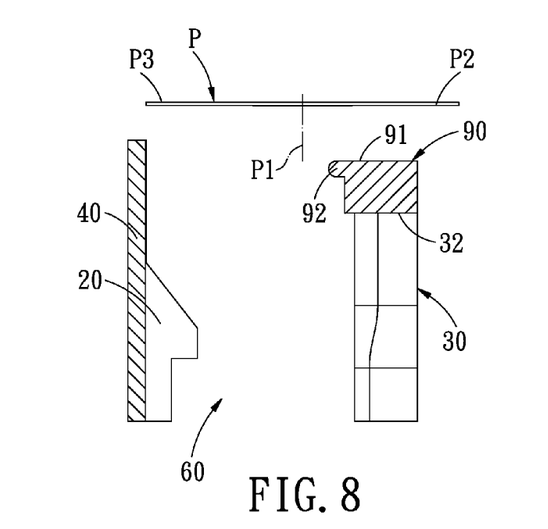
FIG. 8 is a side view of the disc turning device of FIG. 7.

In addition, the other longitudinal member 40 is formed with a rail groove 20 in the direction of gravity, and the longitudinal member 30 is further formed with an opening 33 under the support unit 90 and a stopping portion 32 on an edge of the opening 33 adjacent to the support unit 90, in other words, the longitudinal member 30 successively includes, in the direction of gravity, the support portion 92, the stopping portion 32 and the opening 33. The support portion 92 is located on the top of the longitudinal member 30 and protrudes from one side of the longitudinal member 30 toward the rail groove 20.

Figure 9A:
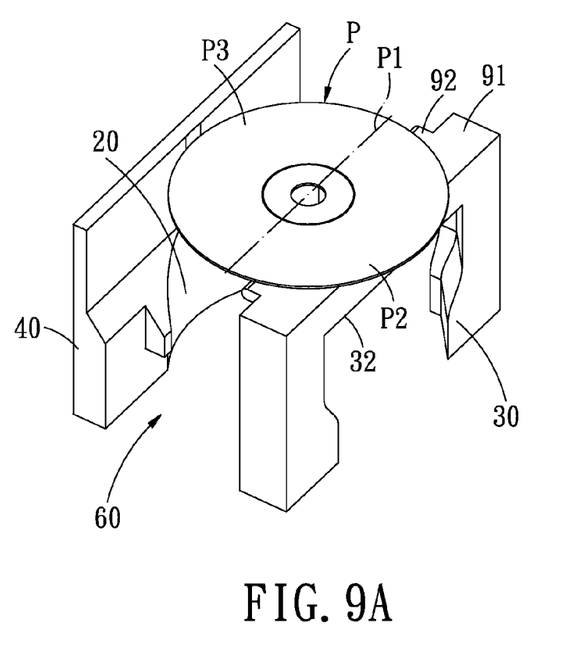
FIG. 9A is a perspective view, showing the disc is placed on the support unit of the one of the longitudinal members of the disc turning device of FIG. 7.
Figure 15A:
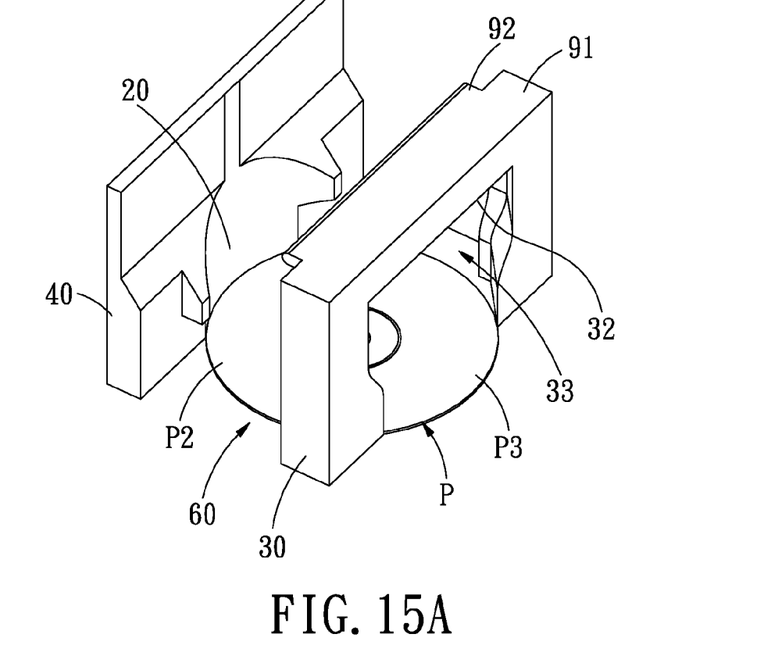
FIG. 15A is a perspective view showing that the disc of FIG. 14A which has been stopped by the stopping portion drops down to finish the turning operation.
Figure 15B:
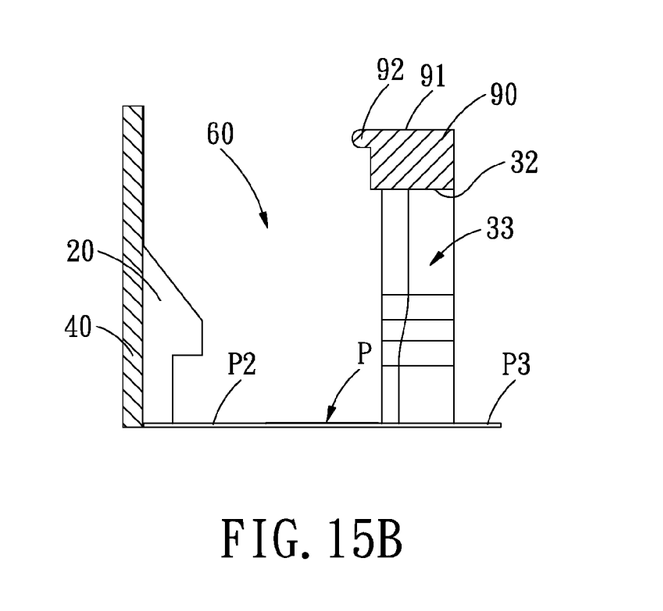
FIG. 15B is a side view of FIG. 15A.

FIGS. 9A-15B illustrate how the disc turning device in accordance with the second embodiment of the present invention performs the disc turning operation. Referring to FIGS. 9A and 9B first, cooperating with the rail groove 20, the disc P is positioned on the top of the support unit 90 of the longitudinal member 30 in such a manner that the gravity center of the disc P is positioned between the support unit 90 and the rail groove 20, so that the disc P, under the action of the gravity, as shown in FIGS. 10A-13B, will turn about the support portion 92 of the support unit 90 along the rail groove 20. Afterwards, as shown in FIG. 14A and FIG. 14B, after turning to pass through the opening 33 and being stopped by the stopping portion 32 of the longitudinal member 30, the disc P will disengage from the support portion 92 and drop down in the direction of gravity. Through the above steps, the disc P has turned 180 degrees and finished the disc turning operation, as shown in FIG. 15A and FIG. 15B.

Figure 9B:
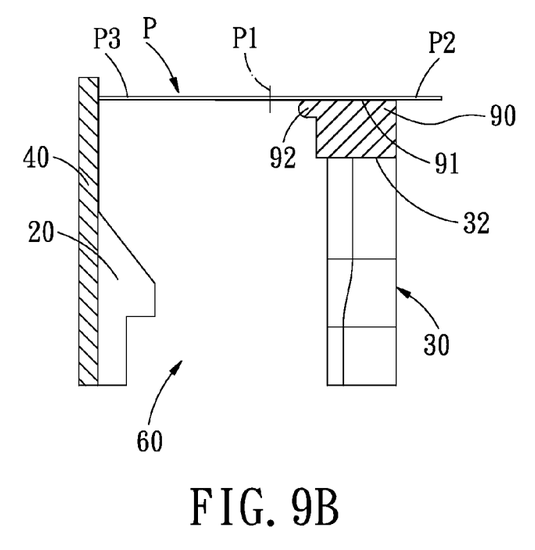
FIG. 9B is a side view of FIG. 9A.
Figure 10A:
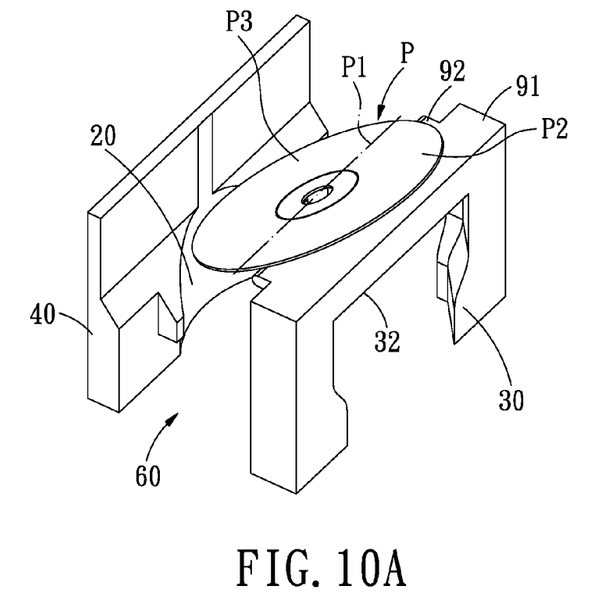
FIG. 10A is a perspective view showing that the disc of FIG. 9A turns about a support portion of the support unit of the disc turning device in accordance with the second embodiment of the present invention.
Figure 10B:
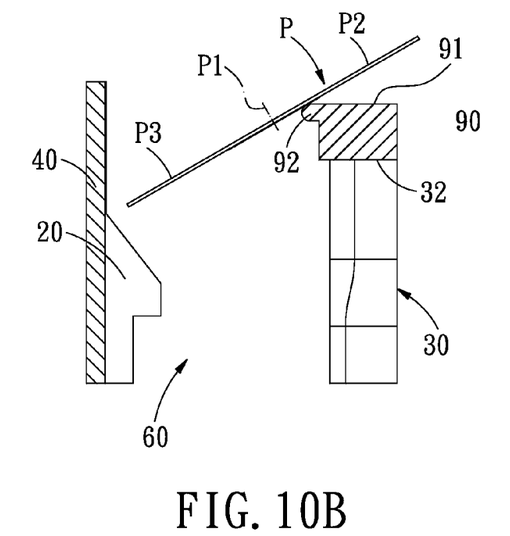
FIG. 10B is a side view of FIG. 10A.
Figure 11A:
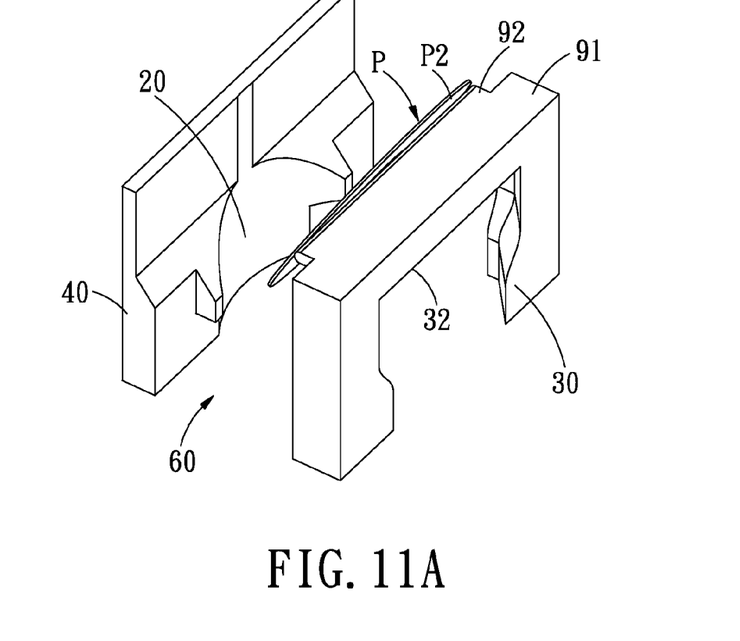
FIG. 11A is a perspective view showing that the disc of FIG. 10A continues turning about the support portion.
Figure 11B:
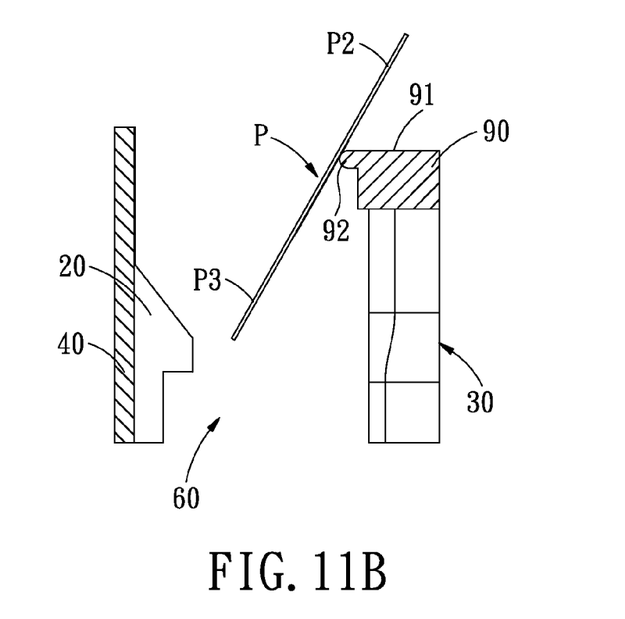
FIG. 11B is a side view of FIG. 11A.
Figure 12A:
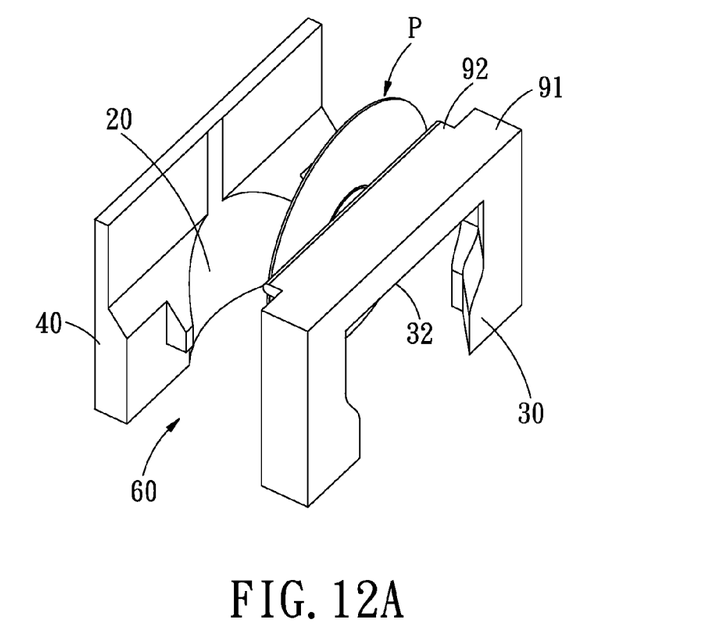
FIG. 12A is a perspective view showing that the disc of FIG. 11A continues turning about the support portion.
Figure 12B:
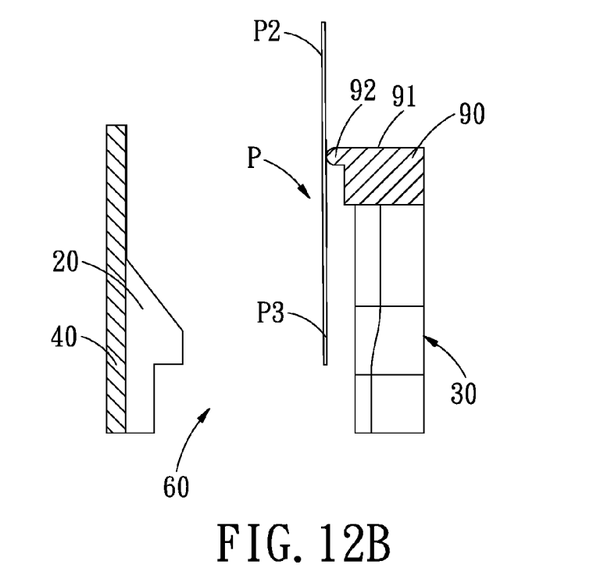
FIG. 12B is a side view of FIG. 12A.
Figure 13A:
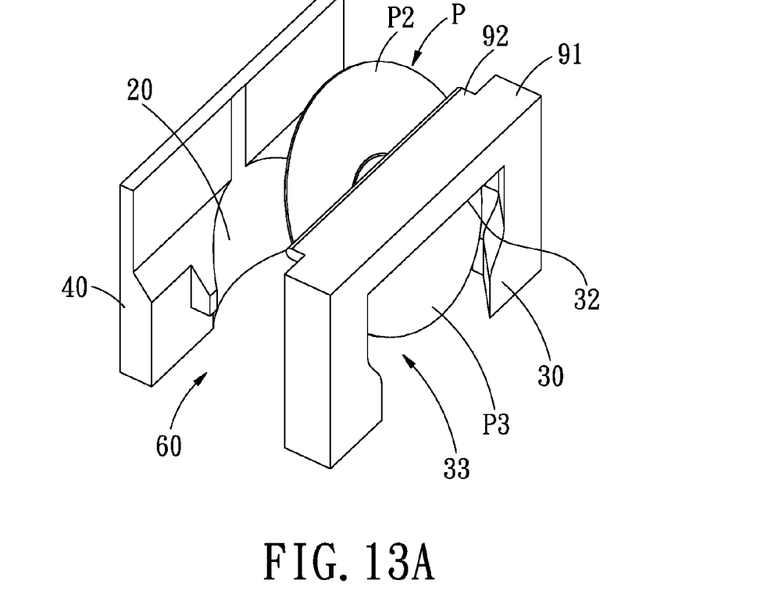
FIG. 13A is a perspective view showing that the disc of FIG. 12A continues turning about the support portion.
Figure 13B:
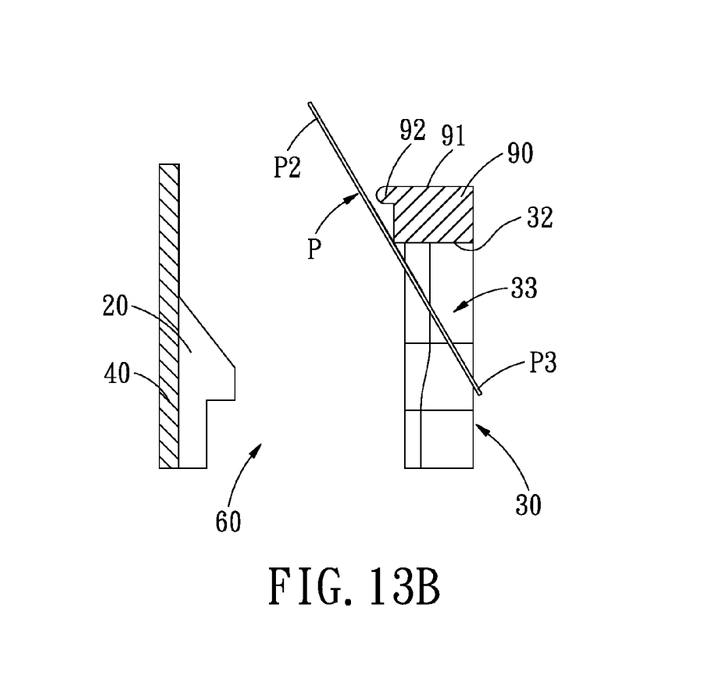
FIG. 13B is a side view of FIG. 13A.
Figure 14A:
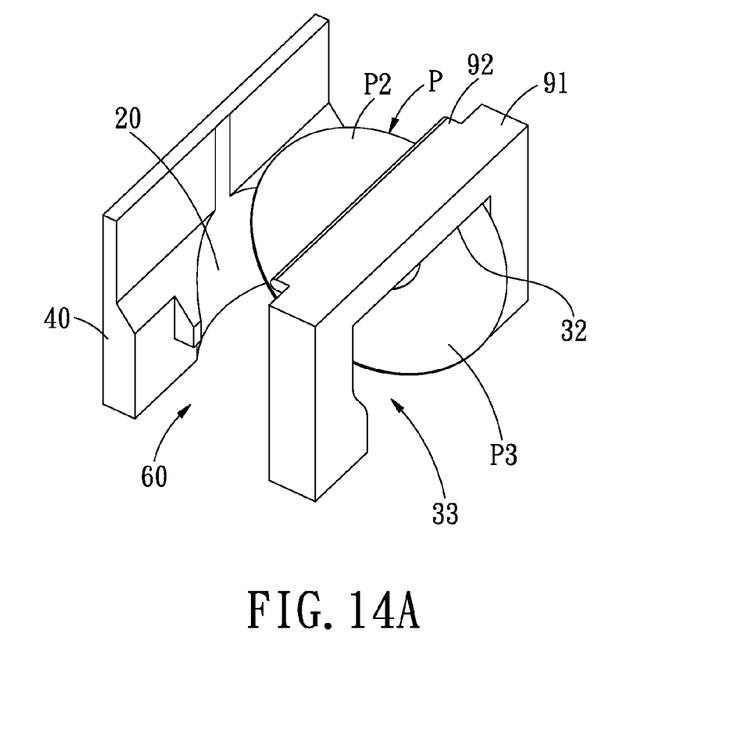
FIG. 14A is a perspective view showing that the disc of FIG. 13A is stopped by a stopping portion of the disc turning device in accordance with the second embodiment of the present invention.
Figure 14B:
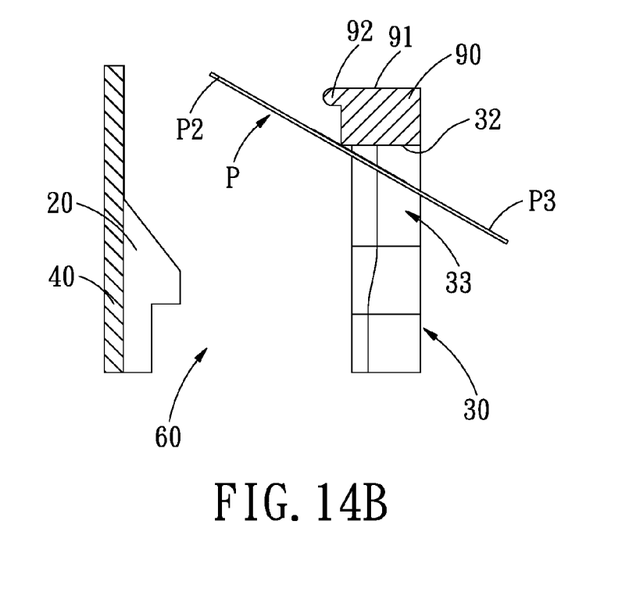
FIG. 14B is a side view of FIG. 14A.

It is to be noted that, in the present embodiment, the disc P is mainly disposed on the support unit 90 of the longitudinal member 30, namely on the longitudinal member 30 which is provided with the support unit 90. Also, the first section P2 of the disc P is disposed on the support surface 91 of the support unit 90 while the support portion 92 of the support unit 90 supports against the portion of the first section P2 of the disc P, which is not located on the center line P1 of the disc P. Therefore, under the action of gravity, the disc P will lose its balance to turn downwards about the support portion 92 within the turning space 60, namely the second section P3 of the disc will turn downwards. In addition, the longitudinal member 40, which is not provided with the support unit 90, is provided with the rail groove 20, so the longitudinal member

40 can limit the turning position of the disc P, and the rail groove 20 of the longitudinal member 40 allows the turning of the disc P to be turned more smoothly.

To summarize, the support portion of the disc turning device in accordance with the present invention is arranged at one side of the centre of gravity of the disc to make the disc turn over automatically by gravity by turning about the support portion, thus achieving the objectives of automatically turning over the disc by gravity, and saving energy.

While we have shown and described various embodiments in accordance with the present invention, it is clear to those skilled in the art that further embodiments may be made without departing from the scope of the present invention.

What is claimed is:

1. A disc turning device being employed to automatically turn over a disc which is divided into a first section and a second section by a radial center line thereof, and comprising:
   a turning space being defined for the disc to perform turning operation therein; and
   at least one support unit being provided with a support surface on a top end thereof, and a support portion protruding from one edge of the support surface thereof, the support unit being formed within the turning space, wherein the first section of the disc is placed on the support surface in such a manner that the second section is suspended, the support portion supports against a portion of the first section of the disc, which is not located on the center line of the disc;
   the turning space is defined by two longitudinal members, one of the longitudinal members is formed with the support unit on a top end thereof, an opening under the support unit, and a stopping portion on an edge of the opening adjacent to the support unit;
   hence, after the disc is placed on the support surface, the disc will turn about the support portion under the action of gravity.

2. The disc turning device as claimed in claim 1, wherein the other of the longitudinal members, which is not formed with the support unit, is defined with a rail groove in the direction of gravity, the support portion of the longitudinal member formed with the support unit protrudes towards the rail groove.

* * * * *